June 12, 1956  W. H. WANNAMAKER, JR., ET AL  2,750,547
ELECTRICAL MEASURING APPARATUS
Filed Aug. 5, 1952
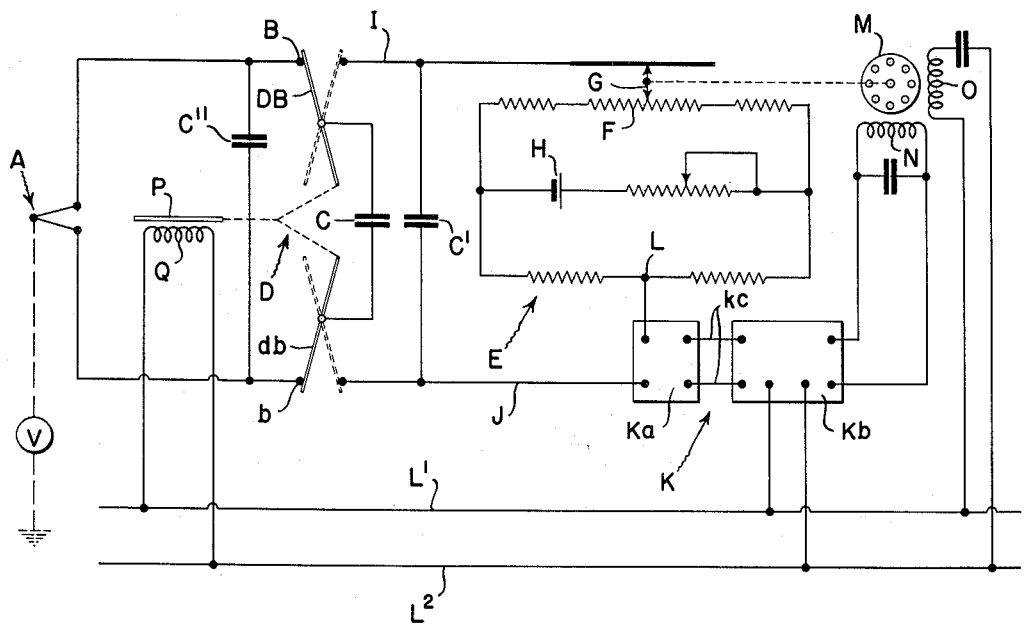
INVENTORS.
WILLIAM H. WANNAMAKER JR.
BY ROBERT L. MILLER
*Arthur H. Swanson*
ATTORNEY.

United States Patent Office 2,750,547
Patented June 12, 1956

2,750,547
ELECTRICAL MEASURING APPARATUS

William H. Wannamaker, Jr., and Robert L. Miller, Philadelphia, Pa., assignors to Minneapolis-Honeywell Regulator Company, Minneapolis, Minn., a corporation of Delaware Application August 5, 1952, Serial No. 302,677

2 Claims. (Cl. 318—29)

The general object of the present invention is to improve measuring apparatus of the type in which a charging capacitor is connected across the input terminals of measuring apparatus, which includes a measuring circuit and an electronic amplifier, during periods alternating with periods in which said capacitor is connected across and charged by a thermocouple or other source of a small variable D. C. voltage to be measured.

More specifically stated, the general object of the present invention is to provide simple and effective means for avoiding or substantially minimizing measurement errors due to stray voltages which the measuring apparatus may pick up and amplify during the periods in which the charging capacitor is not connected across said input terminals.

A known form of measuring apparatus, of the general type mentioned above, is disclosed in the Wills patent, 2,404,894 of July 30, 1946. While that patent was directly concerned with the adverse effects of stray voltages on measuring apparatus, including an amplifier for measuring a thermocouple or other small unidirectional voltage, the patent did not disclose or suggest provisions for protecting measuring apparatus against the pick-up and amplification of stray voltages during the periods in which the input terminals of said apparatus are not connected to the charging capacitor impressing the D. C. voltage to be measured on said apparatus.

A major object of the present invention is to avoid the significant amplification of stray voltages during the periods in which the measuring apparatus is not connected to the charging capacitor and during which such significant amplification of stray voltages may be effected by the apparatus disclosed in said Wills patent.

A specific object of the present invention is to prevent or greatly minimize the pick-up and amplification of stray voltages, when the measuring apparatus is not connected to said charging capacitor, by the use of a second capacitor which is connected across said input terminals during the periods in which the charging capacitor is not connected to said terminals.

A still more specific object of the present invention is to permanently connect said second capacitor across the input terminals of said measuring apparatus and to utilize said second capacitor not only as a protection against the pick-up and amplification of stray voltages during periods in which the measuring apparatus is not connected to the charging capacitor, but also to utilize the second capacitor in averaging and continuously measuring the voltage periodically impressed on the measuring apparatus by the charging capacitor.

A further object of the present invention is to use a pair of capacitors for minimizing the effects of stray signals by using one on the output of a sensing element and the other on the input of a measuring apparatus.

The various features of novelty which characterize our invention are pointed out with particularity in the claims annexed to and forming a part of this specification. For a better understanding of the invention, however, its advantages, and specific objects obtained with its use, reference should be had to the accompanying drawing and descriptive matter in which we have illustrated and described preferred embodiments of our invention.

The one figure of the drawing diagrammatically illustrates a preferred embodiment of the present invention.

In the drawing, A designates a thermocouple having terminals B and b, the voltage between which is to be measured, and D designates a switching mechanism for alternately connecting a capacitor C across the output terminals of the thermocouple A and the input terminals of self-balancing, measuring apparatus. That apparatus comprises a potentiometric circuit E including a slide wire resistor F engaged by a wiper contact G movable along said resistor, and also including a dry cell or analogous source of current H for energizing the circuit E. Said apparatus also comprises a detector circuit including an input terminal I connected to the wiper contact G and a second input terminal J connected through the input circuit of an amplifier K to the circuit E at a point L having a potential normally different from the potential at the point of the slide wire resistor F engaged by the wiper contact G.

When the switching mechanism D periodically connects the charging capacitor C across the input terminals I and J of the measuring apparatus and thereby unbalances the measuring apparatus by changing the potential difference between the point L of the circuit E and the circuit point engaged by the wiper contact G, a control winding N in the output circuit of the amplifier K is actuated to rebalance said apparatus. The rebalancing action is effected by a rebalancing motor M then energized to adjust the wiper contact G in the direction and to the extent required to rebalance the apparatus. As shown, the motor M is a two-phase reversible alternating current motor and includes a power winding O which is connected across alternating current supply conductors L' and L². Those conductors also supply current to the energizing terminals of the amplifier K.

As is hereinafter explained, a direct current flow in the detector circuit is produced by a change in the voltage of the thermocouple A in one direction or in the opposite direction, accordingly as the change in the thermocouple voltage is an increase or decrease. As shown, the amplifier comprises a converter section $ka$ and an amplification section $kb$. The converter section $ka$ is effective to convert the direct current on the input thereof into an alternating current which is transmitted to the amplification section $kb$ by the conductors $kc$, and which is of one phase or the opposite phase depending on the direction of the direct current flow in the detector circuit.

The potentiometric circuit E, amplifier K and motor M may advantageously be similar in type and in their association, to the measuring circuit, amplifier and rebalancing motor of the well known and widely used self-balancing, measuring apparatus disclosed and claimed in the Wills Patent 2,423,540 of July 8, 1947. Hence, further references to the construction and mode of operation of the measuring, amplifying and rebalancing elements of the apparatus diagrammatically shown herein, seems unnecessary.

As schematically shown, the switching mechanism D comprises switch blades DB and $db$ which are link connected to a vibrator armature or solenoid core P which is oscillated back and forth with a predetermined frequency by an alternating current flow through an energizing coil Q. The coil Q may be connected to any available source of suitable frequency to provide the desired capacitor charging and discharging times. As shown, the coil Q is connected across the conductors L' and L² which may well supply alternating current of 60 cycles frequency. It is to be noted, however, that there need be no particular relation between the frequency of vibration of the vibrating armature P and the frequency of the currents energizing the motor windings N and O.

In accordance with the present invention, a second capacitor C' is connected across the terminal conductors I and J of the measuring apparatus. Also, a further capacitor C" is connected across the output terminals of the thermocouple A. The capacitor C', so connected, serves two purposes. First, it practically eliminates, or greatly minimizes, a tendency which would otherwise exist for the measuring apparatus to pick-up and amplify stray currents during the periods in which the charging capacitor C is out of engagement with the terminal conductors I and J. This is due to the short circuiting action of capacitor C' to unwanted high frequency strays. Secondly, the capacitor C' when permanently connected across the terminal conductors I and J, advantageously modifies the measuring operations. Likewise, the capacitor C" serves to eliminate stray signals on the output of the thermocouple A by serving to establish a steady voltage on the conductors I and J proportional to the voltage from the thermocouple A.

When neither of the capacitors C and C' is connected across the terminal conductors I and J, the detector circuit is open and constitutes an antenna-like structure which when extending into stray electric or magnetic fields, introduces stray signals into the measuring circuit and thereby injuriously affects the measuring accuracy of the apparatus. When connected across the terminals I and J, the capacitor C' serves successfully to prevent extraneous signals from being introduced into the potentiometer measuring circuit even when the latter extends into extraneous electric and magnetic fields. Thus the capacitor C' prevents the measuring circuit from being opened by the adjustment of the switch blades DB and db from their dotted line positions into their full line positions shown in the drawing, in which the capacitor C is charged by the thermocouple A. The capacitor C" serves to minimize the radiation effects of the thermocouple leads.

The adjustment of the double pole-double throw switch mechanism D to disconnect the charging capacitor C from the capacitor C" and thermocouple A, and connect it across the terminals I and J, results in the application to the capacitor C' of the charge on the capacitor C. The average unidirectional voltage thus impressed on the capacitor C' corresponds to the developed thermocouple voltage, is continuously measured by the measuring apparatus, and indicated by the position of the wiper contact G along the slide wire F. The unidirectional voltage on the capacitor C' is thus opposed to the potentiometer slide wire voltage and any unbalanced voltage difference between the opposed unidirectional voltage is converted into an alternating voltage by the converter section $ka$, is amplified in the amplifier section $kb$, and operates through the control winding N and motor M to effect the proper rebalancing adjustment of the wiper contact G. The measuring operation and result obtained with the capacitor C' permanently connected across the detector circuit is thus different in character and more accurate than it would be if the capacitor C' were omitted. Ordinarily, the maximum stray voltage elimination effect is obtained when the capacitor C' has its terminals connected to the terminals I and J immediately adjacent the free ends of the latter.

Since the thermocouple voltage is impressed on the measuring circuit through the capacitor C, only during periods in which that capacitor is disconnected from the thermocouple, the measuring circuit is isolated at all times from the thermocouple circuit. Such isolation is especially important when the associated thermocouple is used to measure the temperature in an electric furnace, since in such use there is apt to be D. C. voltage leakage from the thermocouple to ground. That leakage voltage is indicated in the drawing by the symbol V in the ground connection to the thermocouple. Such leakage would impair the measurement accuracy if the measuring circuit were not isolated from the thermocouple at all times.

While, in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features.

Having now described our invention, what we claim as new and desire to secure by Letters Patent, is:

1. An electrical measuring apparatus for a thermocouple output voltage comprising, a pair of terminals arranged for connection to a thermocouple, a first capacitor connected across said terminals, a potentiometric circuit, a second capacitor connected in series with said potentiometric circuit, a third capacitor, and vibratory switching means for alternately connecting said third capacitor between said first and second capacitors so that said second capacitor will assume a potential proportional to the potential on said first capacitor and said first and second capacitors will act to minimize the effects of stray electrical fields on said terminals and said potentiometric circuit.

2. An electrical measuring apparatus for a thermocouple output voltage comprising, a pair of terminals arranged for connection to a thermocouple, a first capacitor connected across said terminals, a potentiometric circuit, a second capacitor connected in series with said potentiometric circuit, a third capacitor, and vibratory switching means for alternately connecting said third capacitor between said first and second capacitors so that said second capacitor will assume a potential proportional to the potential on said first capacitor and said first and second capacitors will act to minimize the effects of stray electrical fields on said terminals and said potentiometric circuit, a second vibratory switching means connected to said measuring apparatus for changing the electrical character of the combined charge of said potentiometric circuit and said second capacitor, and motor means controlled by said measuring apparatus for adjusting said potentiometric circuit until the voltage thereof balances the charge of said second capacitor.

References Cited in the file of this patent

UNITED STATES PATENTS

| 2,404,894 | Wills | July 30, 1946 |
| 2,593,950 | Williams | Apr. 22, 1952 |
| 2,618,674 | Stanton | Nov. 18, 1952 |
| 2,619,514 | Stanton | Nov. 25, 1952 |
| 2,648,037 | Harrison | Aug. 4, 1953 |